United States Patent
Hafeez et al.

(10) Patent No.: US 12,457,502 B2
(45) Date of Patent: Oct. 28, 2025

(54) SYSTEM AND METHOD FOR HIGHLY DYNAMIC SPECTRUM SHARING

(71) Applicant: CHARTER COMMUNICATIONS OPERATING, LLC, St. Louis, MO (US)

(72) Inventors: Abdulrauf Hafeez, Cary, NC (US); Amitav Mukherjee, Elk Grove, CA (US); Maulik Vaidya, Escondido, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 714 days.

(21) Appl. No.: 17/711,530

(22) Filed: Apr. 1, 2022

(65) Prior Publication Data
US 2023/0319582 A1    Oct. 5, 2023

(51) Int. Cl.
*H04W 16/14*    (2009.01)
*H04W 72/12*    (2023.01)

(52) U.S. Cl.
CPC ....... *H04W 16/14* (2013.01); *H04W 72/1215* (2013.01)

(58) Field of Classification Search
CPC . H04W 16/14; H04W 72/0453; H04W 24/08; H04W 72/23; H04W 72/1215; G01S 7/003
See application file for complete search history.

(56) References Cited

U.S. PATENT DOCUMENTS

| | | | |
|---|---|---|---|
| 10,980,025 B2 | 4/2021 | Hmimy et al. | |
| 11,751,065 B2 * | 9/2023 | Khan | H04W 28/26 455/454 |
| 11,751,280 B2 * | 9/2023 | Hafeez | H04W 36/22 370/331 |
| 11,758,409 B2 * | 9/2023 | Ahmavaara | H04W 72/0453 370/329 |
| 2019/0215698 A1 * | 7/2019 | Balachandran | H04W 88/12 |
| 2019/0373615 A1 * | 12/2019 | Cimpu | H04W 72/541 |
| 2024/0389084 A1 * | 11/2024 | Usui | H04W 72/0453 |

* cited by examiner

*Primary Examiner* — Marcus Hammonds
(74) *Attorney, Agent, or Firm* — Patent Beach PC

(57) ABSTRACT

Various embodiments comprise systems, methods, architectures, mechanisms and apparatus configured to enable wireless stations to use their shared spectrum grants proximate a priority/incumbent user of the shared spectrum by generating a propagation model of the priority/incumbent user, determining a potential interference therewith by each of at least one group of similarly located wireless stations proximate the priority user, determining a modification to a spectrum grant for each wireless station group that would avoid interference with the priority/incumbent user by the respective wireless stations of the group, and updating the spectrum grants of each wireless station in a wireless station group using the determined spectrum grant modification associated with the wireless station group.

20 Claims, 3 Drawing Sheets

SYSTEM AND METHOD FOR HIGHLY DYNAMIC SPECTRUM SHARING

FIELD OF THE DISCLOSURE

The present disclosure generally relates to wireless communications systems and related networks, and more particularly to mechanisms for avoiding use of shared spectrum in a manner conflicting with that of incumbent/priority users of such spectrum.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Conventional wireless networks include any of different types of communication devices supporting different wireless protocols. For example, two types of wireless networks support so-called LTE (Long Term Evolution) or NR (New Radio) communications in which user equipment is able to communicate with a base station (such an eNodeB, gNodeB, etc.) via use the LTE or NR protocol to access a respective network.

In certain instances, wireless stations such as those supporting LTE or NR share use of wireless spectrum with other entities. For example, the U.S. military/DoD (Department of Defense) and other federal agencies operate a broad swathe of land-based, sea-based, and airborne radar systems in the UHF (Ultra High Frequency) and SHF (Super High Frequency) bands between 300 MHz (MegaHertz) and 30 GHz (GigaHertz). Some of the frequency bands used to support military radar operations that also overlap with 5G NR bands are: 420-450 MHz, 902-928 MHz, 2900-3100 MHz, 3100-3650 MHz, and 5250-5900 MHz.

The CBRS band (3550-3700 MHz) considers military radar to be incumbent operations that are protected from interference due to mobile or fixed wireless PAL (Priority Access License) and GAA (General Authorized Access or lower-priority users) operations. So-called dynamic Protection Areas (DPAs) are defined areas in which the military may be operating systems that require protection from CBRS (Citizens Band Radio System) base station (such as a CBSD or Citizens Broadband Radio Service Device) emissions. The net effect is to introduce limits on how much aggregate in-band and out-of-band interference can be generated by CBSDs in the vicinity of DPAs.

If the DPA is not 'always ON', the detection of the presence of incumbent users is performed by Environmental Sensing Capability (ESC) sensors monitoring a respective region. Alternatively, an Incumbent-Informing Capability (IIC) may directly inform CBRS spectrum administrators about the planned use of shared spectrum. CBSDs with a large interference contribution to an activated DPA may have their spectrum grants suspended and be moved to another operating channel. The suspension of CBSDs continues until the protection threshold is met.

The primary federal incumbent in the 3.5 GHz band is the U.S. Navy shipborne SPN-43 air traffic control radar, as well as other DoD (Department of Defense) ground-based radar systems. Some information regarding military radar waveforms such as SPN-43 is available in the public domain. See NIST Technical Note 1954, 3.5 GHz Radar Waveform Capture at Point Loma, 2017.

In the government implemented RADAR (RAdio Detection And Ranging) systems, the so-called pulse repetition interval is the time interval between pulses and is the inverse of the pulse repetition frequency. The pulse duration is the duration of a single pulse. The antenna rotation period is the time interval between successive peaks of received power due to the rotation of the radar's transmitting antenna in the azimuth plane.

It is noted that an existing NR (New Radio) feature includes a semi-static channel access mode defined in Rel-16 for NR-Shared operation in 5-7 GHz. For example, a gNB can initiate a transmission burst at fixed instances of time after a successful clear channel assessment (CCA). The duration of each burst with DL (DownLink) and UL (UpLink) transmissions is a COT (Channel Occupancy Time), which is followed by an Idle Period where transmissions are not allowed. The COT and Idle Period together comprise a Fixed Frame Period (FFP) that can be between 1 ms (millisecond) to 10 ms in duration, and the Idle Period is at least 5% of the Channel Occupancy Time, with a minimum of 100 µs (microsecond) duration. See ETSI EN 301 893 V2.1.1 (2017 May).

However, semi-static channel access was designed for isolated NR networks and is not suitable for radar coexistence since the CCA (Clear Channel Assessment) may fail due to radar signals and the COT is a continuous interval of regular-power transmissions without off periods of extended durations or pulse-level on-off switching.

SUMMARY

Various embodiments are directed to methods, apparatus, systems, architectures, mechanisms and apparatus configured to enable wireless stations to use their shared spectrum grants proximate a priority/incumbent user of the shared spectrum (e.g., a RADAR (RAdio Detection And Ranging) system) by generating a propagation model of the priority/incumbent user (e.g., using incumbent informer provider (IIP) data), determining a potential interference therewith by each of at least one group of similarly located wireless stations proximate the priority user, determining a modification to a spectrum grant for each wireless station group that would avoid interference with the priority/incumbent user by the respective wireless stations of the group, and updating the spectrum grants of each wireless station in a wireless station group using the determined spectrum grant modification associated with the wireless station group.

One embodiment comprises a method of adapting wireless stations to priority use of shared spectrum, the method comprising: granting use rights to shared spectrum to wireless stations in a wireless network; identifying operation proximate at least some of the wireless stations in the wireless network environment of a priority user of the shared spectrum; using incumbent informer provider (IIP) data to generate a propagation model of spectral and temporal use of the shared spectrum by the priority user; identifying, within at least the wireless stations proximate the priority user, one or more groups of similarly located wireless stations; determining, for each group of wireless stations, a spectrum grant modification that would avoid interference with the priority user; and updating the spectrum grants of each wireless station within a group of wireless stations in accordance with the spectrum grant modification determined for the group.

One embodiment comprises a computer-implemented method in a spectrum allocation management resource (SAMR) configured for managing multiple wireless stations, access points (APs), mobile base stations (e.g., eNBs, gNB, and the like) configured to use shared spectrum to provide thereby a wireless local area network (WLAN) services to subscriber user equipment (UE).

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1A:
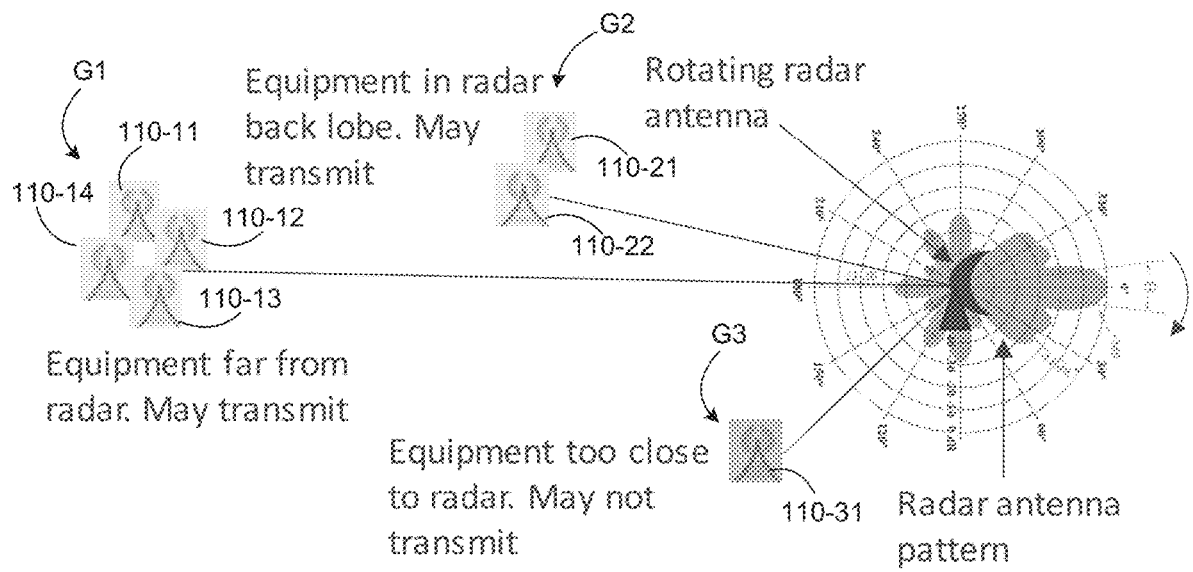
FIGS. 1A-1B are graphical illustrations of RADAR antenna patterns and their impact with respect to proximate groups of commercial equipment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments will be described with respect to enabling wireless stations to use shared spectrum grants proximate a priority/incumbent user of the shared spectrum (e.g., a RADAR (RAdio Detection And Ranging) system) by generating a propagation model of the priority/incumbent user (e.g., using incumbent informer provider (IIP) data), determining a potential interference therewith by each of at least one group of similarly located wireless stations proximate the priority user, determining a modification to a spectrum grant for each wireless station group that would avoid interference with the priority/incumbent user by the respective wireless stations of the group, and updating the spectrum grants of each wireless station in a wireless station group using the determined spectrum grant modification associated with the wireless station group.

The various embodiments are particularly well suited to enabling spectrum coexistence of incumbent users and commercial users, such as US government land-based or ship-based RADAR and commercially used wireless stations.

For exemplary purposes, the embodiments will be described within the context of particular shared spectrum regions, though the embodiments are also well suited to other shared spectral regions. Specifically, the embodiments will be described within the context of priority use by U.S. military/DoD and other federal agencies operating a broad swathe of land-based, sea-based and airborne radar systems in the UHF and SHF bands between 300 MHz and 30 GHz. Some of the frequency bands with military radar operations that also overlap with 5G NR bands are: 420-450 MHz, 902-928 MHz, 2900-3100 MHz, 3100-3650 MHz, and 5250-5900 MHz. For example, the CBRS band (3550-3700 MHz) has military radars as incumbent users that are protected from interference from mobile or fixed wireless PAL and GAA operations.

Dynamic Protection Areas (DPAs) are areas in which the military operates radars from time to time that require protection from CBRS emissions. The presence of incumbent users is sensed by Environmental Sensing Capability (ESC) sensors, or provided by Incumbent-Informing Capability (IIC) providers. CBSDs with large interference contributions to an activated DPA may have their spectrum grants suspended or moved to other channels temporarily, if available. DPAs cover large populations resulting in a large bandwidth/spectrum impact where CBRS devices cannot access spectrum for several hours a day in many cases.

Figure 1B:
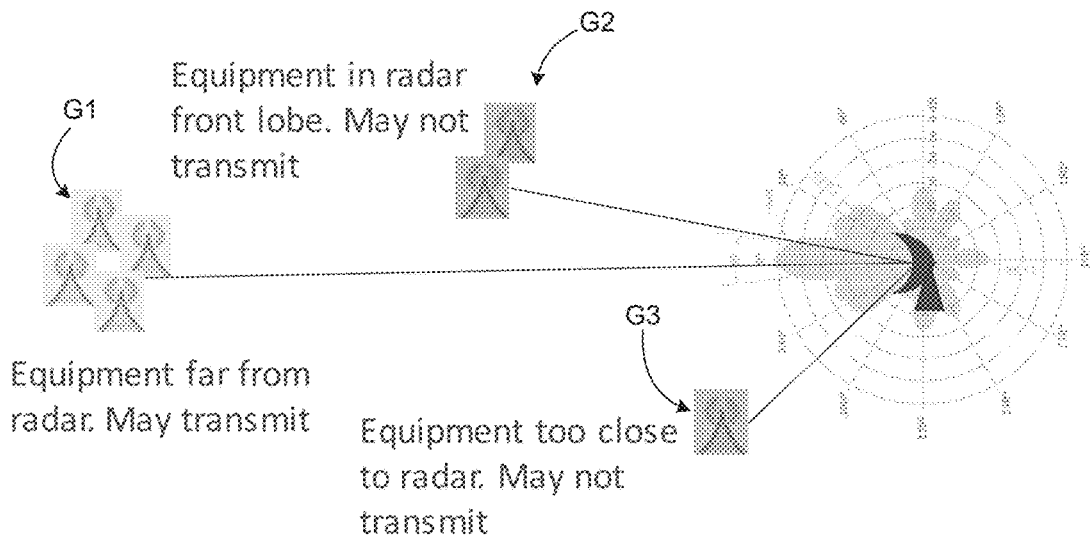

FIGS. 1A-1B are graphical illustrations of RADAR antenna patterns and their impact with respect to proximate groups of commercial equipment. Specifically, FIGS. 1A-1B graphically illustrate RADAR antenna pattern impact upon spectral sharing with different groups of commercial equipment at different times. In particular, FIGS. 1A-1B depict a rotating RADAR antenna pattern emanating from RADAR source at a location (fixed or moving) with respect to the location of (illustratively) three groups of wireless stations; namely, G1-G3.

Each of the groups comprises one or more wireless stations located within a defined geographic area (e.g., a neighborhood or other residential/commercial area or portion thereof). The geographical area for a particular group may simply comprise that area within which each of the included wireless stations may be configured in substantially the same manner within the context of a wireless spectrum sharing operation as contemplated herein. That is, rather than individually calculating a configuration for each wireless station to share spectrum with incumbent users, groups of wireless stations are defined wherein each wireless station in the group may substantially use a configuration common to all of the wireless stations of the group.

Referring to FIG. 1A, at a time t1 the main lobes of the RADAR antenna pattern are pointing away from first group G1. First group G1 and second group G2 are located sufficiently far away from the RADAR source such that they may be permitted to transmit via spectrum shared with the RADAR source. However, group G3 is too close to the RADAR source and therefore is not permitted to transmit via spectrum shared with the RADAR source.

Referring to FIG. 1B, at a time t2 the main lobes of the RADAR antenna pattern are pointing toward first group G1. First group G1 is still sufficiently far away from the RADAR source such that it may be permitted to transmit via spectrum shared with the RADAR source. However, second group G2 is now too close (and third group G3 still too close) to the RADAR source and therefore not permitted to transmit via spectrum shared with the RADAR source.

It will be appreciated that time during which a group G of wireless stations depends their location with respect to the RADAR source and, more particularly, the time during which the direction, transmission power, and transmission frequency of the RADAR source are such that the main and side lobes of the RADAR source do not result in RADAR operation that would be impacted by transmission of the wireless stations within the group G.

The presence or expected presence of incumbent users of spectrum such as the RADAR transmitter of FIGS. 1A-1B may be provided via an Incumbent-Informing Capability (IIC) notified by the RADAR source (e.g., a US Navy ship entering a harbor), or by Environmental Sensing Capability (ESC) sensors monitoring the spectrum and identifying RADAR transmissions or transmission types associated with incumbent users. These transmissions and the relevant operating parameters may be monitored/determined by dedicated arrays of sensors, sensors implemented at one or more eNB/gNB, and/or other types of sensors individually or in coordination with other network elements.

It is noted that the primary federal incumbent in the CBRS band is the U.S. Navy shipborne air traffic control radar, as well as other DoD ground-based radars. Waveform parameters for commonly used radar such as SPN-43 are as follows:

|  | 1973 Specification [3, 4] | 2005 Specification [5] |
| --- | --- | --- |
| Transmitter |  |  |
| Tuning range (MHz) | 3590 to 3700 | 3500 to 3700 |
| Pulse generation method | Magnetron | Magnetron |
| Pulse repetition interval (μs) | 889(±25) | 1000 |
| Pulse duration (μs) | 0.9(±0.15) | 0.95(±0.05) |
| Peak power output (kW) | 850(±150) | 1000 |
| Antenna |  |  |
| Polarization | Horizontal or left-hand circular, switchable | |
| Gain (boresight, dBi) | 32 | >33.4 |
| Rotation period (s) | 4 | 4 |

The rotation period is the period over which the radar antenna completes a full rotation in the azimuthal plane.

While the radar is periodically turned away from a geographical location (e.g., the location of a wireless station or group thereof), its antenna may not be affected by interference arising from commercial devices using the spectrum in that location.

With the incumbent user operating information (e.g., operational parameters of a RADAR including location, operating frequency, direction of use, and timing associated with the direction of use), one or more spectrum access controllers (SACs) associated with wireless stations or groups thereof within the relevant area (e.g., a DPA) may be used to configure the wireless stations individually or in groups to operate in a shared mode in which use of respective assigned bandwidth of the wireless stations or groups thereof are modified in accordance with an antenna pattern of the RADAR.

Thus, in various embodiments, Environmental Sensing Capability (ESC) sensors, Incumbent-Informing Capability (IIC) providers, an incumbent informer/sensor (IIS), or some combination thereof are used to provide information to a spectrum access controller (SAC) operative to control commercial device access to share spectrum in short periods during incumbent use of the spectrum without affecting incumbent operation.

Figure 2:
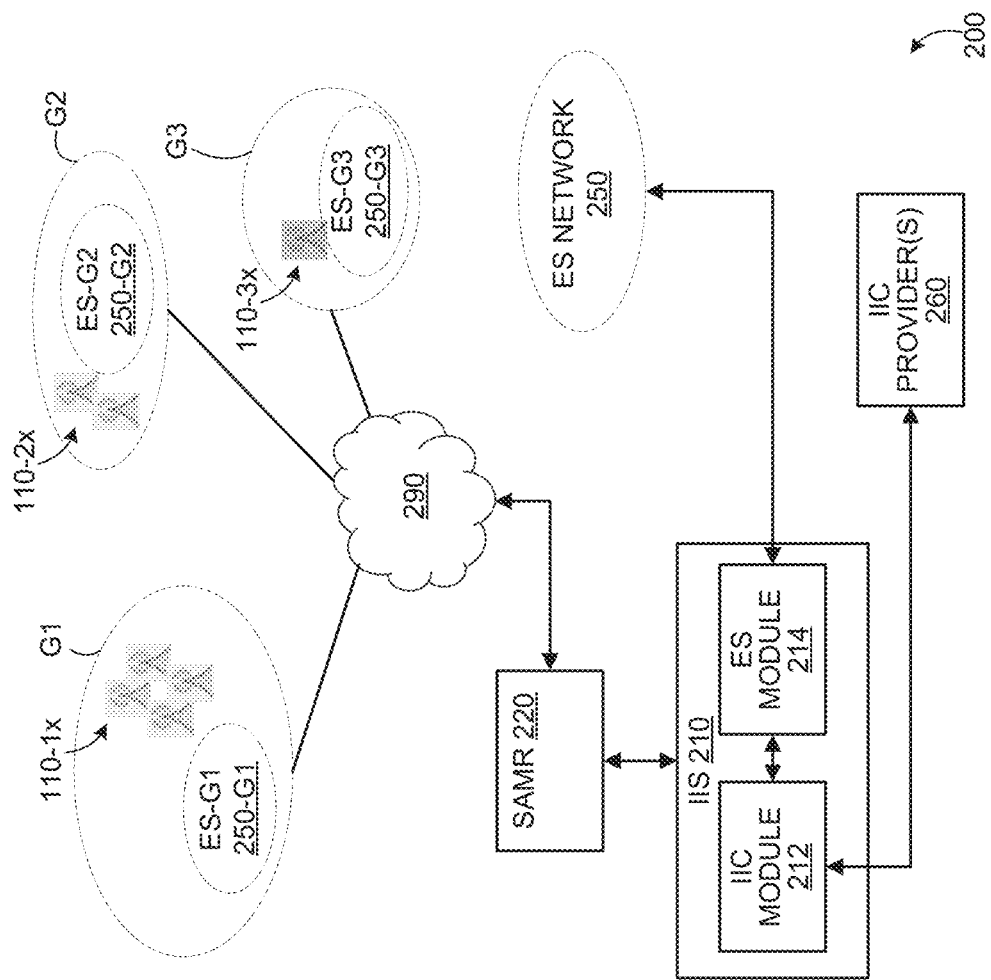
FIG. 2 depicts a wireless network environment suitable for use in describing the various embodiments.

FIG. 2 depicts a wireless network environment suitable for use in describing the various embodiments. Specifically, the network environment 200 of FIG. 3 includes incumbent informer/sensor (IIS) and related resources 210, spectrum allocation management resource (SAMR) 220, a first group G1 of wireless stations 110-1x within first defined area, a second group G2 of wireless stations 110-2x within a second defined area, a third group G3 of wireless stations 110-3x within a third defined area, and a network 290 supporting communications with the wireless stations of the various groups.

The IIS resource 210 is depicted as comprising a incumbent informing capability (IIC) module 212. The IIC module 212 receives information from one or more IIC providers 260; namely, incumbent spectrum user operating information such as (i) frequency of operation, (ii) location, and (iii) timing/direction of use, and so on as reported to the IIC providers 260 by incumbent users.

The IIS resource 210 communicates with the SAMR 220 to provide thereto information pertaining to incumbent spectrum user operations so that the SAMR 220 may revoke spectrum grant or otherwise configure wireless stations, either individually or in groups, so as to avoid interference with an incumbent spectrum user.

In some embodiments, the IIS resource 210 further includes an environmental sensing (ES) module 214. The ES module 214 receives information from an ES network 250 configured to sense the use of shared spectrum by incumbent spectrum users. The ES network 250 may comprise many sensing components distributed over a wide area, such as along a shoreline associated with a naval base. Further, the ES network may comprise ES centers associated with specific neighborhoods or areas, including areas used to define groups of wireless stations. As an example, FIG. 2 depicts the first group G1 of wireless stations as including a corresponding environmental sensing network 250-G1, the second group G2 of wireless stations as including a corresponding environmental sensing network 250-G2, and the third group G3 of wireless stations as including a corresponding environmental sensing network 250-G3. It is noted that the group sensing networks 250-GX may comprise sensing devices co-located with the wireless stations forming the group, or may in fact comprise the wireless stations themselves.

In various embodiments, the IIS 210 performs various calculations to identify or otherwise determine operating parameters associated with various incumbent spectrum users and provide that information directly to the SAMR 220 for further processing as described herein. In various embodiments, the IIS 210 performs the further processing as described herein. In various embodiments, rather than being implemented as separate entities, the IIS 210 and SAMR 220 are implemented together as one entity.

The further processing such as performed by the SAMR 220 uses this information provided by the IIS 210 to control commercial device access to the spectrum based on (i) device location, (ii) device transmitter and incumbent receiver characteristics, and (iii) device timing/direction. That is, the operation of the wireless stations either individually or as groups is configured or reconfigured as appropriate to avoid interference with the incumbent spectrum user.

As an example, assume that incumbent spectrum user operating information associated with each of a first incumbent user comprising a ground-based radar and a second incumbent user comprising a shipborne radar has been received, sensed, or otherwise determined. The shipborne radar is equipped with a GPS receiver for timing. The ground based radar is equipped with internal timing.

The IIS 210 obtains information about their spectrum use as well as radar rotation timing/phase and antenna patterns. Using the timing/phase and antenna pattern of the incumbent radars provided by the IIS 210, the SAMR 220 authorizes commercial devices (e.g., wireless stations comprising macro and/or small cell equipment either individually or in groups as shown) to use incumbent spectrum dynamically in short periods without causing interference to the incumbent users, as will be discussed below with respect to FIG. 3.

Various elements or portions thereof depicted in FIGS. 1-2 and having functions described herein are implemented at least in part as computing devices having communications capabilities, including for example various wireless stations 110, IIS and related resources 210, SAMR 220, ESs 250, IIC providers 260 and so on. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces (e.g., GUI delivery mechanism, user input reception mechanism, web portal interacting with remote workstations and so on) and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Figure 3:
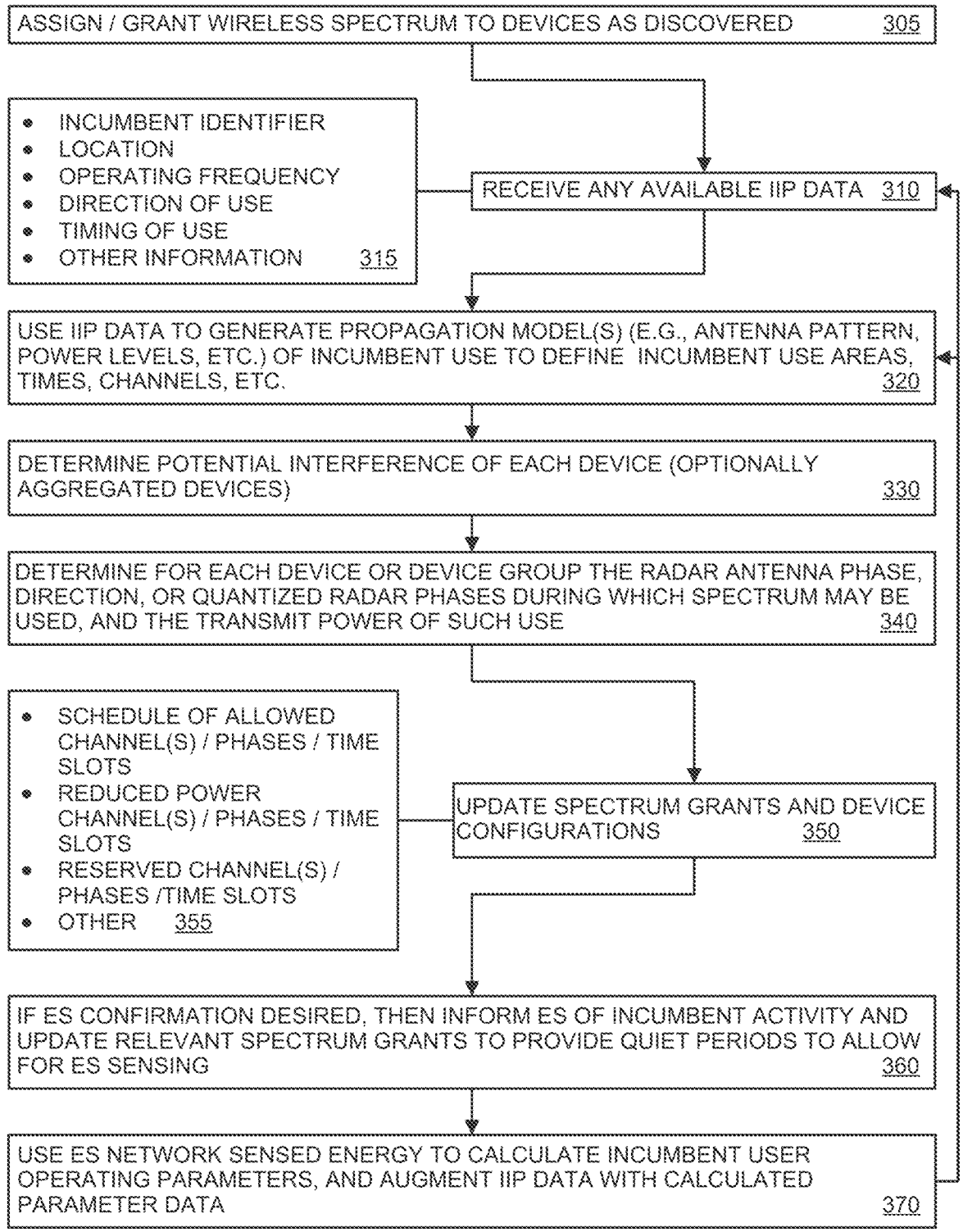
FIG. 3 depicts a method according to an embodiment.

FIG. 3 depicts a method according to an embodiment. Specifically, FIG. 3 depicts a method 300 of adapting wireless stations to priority use of shared spectrum as described herein. Generally speaking, the method is configured for granting use rights to shared spectrum to wireless stations in a wireless network; identifying operation proximate at least some of the wireless stations in the wireless network environment of a priority user of the shared spectrum; using incumbent informer provider (IIP) data to generate a propagation model of spectral and temporal use of the shared spectrum by the priority user; identifying, within at least the wireless stations proximate the priority user, one or more groups of similarly located wireless stations; determining, for each group of wireless stations, a spectrum grant modification that would avoid interference with the priority user; and updating the spectrum grants of each wireless station within a group of wireless stations in accordance with the spectrum grant modification determined for the group.

At step 305, the SAMR 220 assigns wireless spectrum grants to commercial devices such as wireless stations individually, as a group, and/or as such devices are discovered or otherwise made known to the SAMR 220 so as to enable such devices to communicate amongst each other.

At step 310, the IIC module 212 of the IIS 210 receives any available IIP data. Referring to box 315, such IIP data may comprise incumbent user identifiers, location, operating frequencies, direction of use, timing of use, and/or other information.

At step 320, the SAMR 220 uses the received IIP data to generate propagation models of spectrum use by the one or more incumbent spectrum users so as to define incumbent use areas, times, channels, and so on. Such propagation models comprise, for example, antenna patterns, power levels associated with such patterns, timing information, directional information and so on as retrieved or inferred by the IIP data alone or in conjunction with other information sources (e.g., such as via the ES network 250).

At step 330, the SAMR 220 uses propagation models to determine the potential interference of a commercial user device received at an incumbent location as follows:

$$I = P\_tx + G\_tx - L\_prop + G\_rx \quad \text{(eq. 1)}$$

where P_tx is the commercial device transmit power, G_tx is the transmitter antenna gain, L_prop is the path loss and G_rx is the incumbent receiver antenna gain.

It is noted that the receiver antenna gain depends on the phase/direction of the radar antenna at a given time, such as previously discussed with respect to FIGS. 1A-1B.

In various embodiments, the SAMR 220 optionally aggregates potential interference from all commercial devices in a particular area or neighborhood (e.g., such as defined by a for a group Gx or portion thereof) for each incumbent, and compares the aggregated interference to a threshold level of interference to determine whether an aggregated interference level is sufficiently low, that is whether I_agg<Threshold, where Threshold generally depends on the noise sensitivity of the incumbent receiver.

At step 340, the SAMR 220 determines which commercial devices or groups thereof are allowed to use the spectrum for each radar antenna phase/direction, or a quantized set of radar phases. For instance, radar directional phases of 0°, 5°, 10°, 15°, 20° etc. are converted by the SAMR 220 into times or time slots using knowledge of the radar timing (e.g., rotation time such as 4 seconds per full rotation giving the direction or directional phase of the antenna at any given time in the future). It is noted that this information may be also be updated in the case of a moving antenna, such as a shipborne antenna.

In the case of multiple incumbent radars active in a particular area, the SAMR 220 at step 340 performs the various calculations for each incumbent. In this case, the commercial devices or groups thereof are only allowed to use the spectrum if the radar antenna phase/direction, or a quantized set of radar phases, for each of the multiple radars is such that there would be no interference with any incumbent spectrum user.

At step 350, the SAMR 220 updates the relevant SAS grants and device configurations to conform to the determinations of when the devices are enabled to use the shared spectrum. In this manner, the updated devices operate in a shared spectrum mode to only use the shared spectrum during assigned times within the radar rotation period, and at assigned levels of transmit power. These updates allow the commercial devices such as wireless stations to fully use the shared spectrum during the time when all radars or other incumbent users cease operation from the perspective of the commercial devices.

At step 360, if ES confirmation is desired, the ES module 214 of the IIS 210 (or the SAMR 220 directly, or via the IIS 210 as in the illustrated embodiment), informs the ES network 250 that there is incumbent activity to be sensed during quiet periods, and the SAMR 220 updates the relevant spectrum grants to provide for the quiet periods. That is, commercial devices such as wireless stations are configured to avoid operating within the shared spectrum during certain time slots (quiet time slots), during which the sensing elements of the ES network 250 will only be sensing or detecting energy associated with incumbent users.

At step 370, the ES module 214 of the IIS 210 processed the sensed energy information from the ES network 250 to calculate incumbent user (e.g., radar source) operating parameters, such as location (e.g., via triangulation), transmission frequency, rotational time/speed, radar type and so on. Further, the IIP data is augmented with some or all of the incumbent user operating parameter calculations. The method may then proceed to step 320 or step 310 for further processing of augmented IIP data.

In various embodiments, the operation of the method 300 of FIG. 3 is modified where the incumbent user comprises a bistatic or multistatic radar systems (i.e., radar transmitter and receiver are not co-located as in a monostatic radar but separated by a usually large distance), the IIP data includes location information about the incumbent radar receiver which is then used to protect the incumbent while sharing spectrum.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method, comprising:
   granting shared spectrum use rights to wireless stations in a wireless network;
   identifying operation proximate at least some of the wireless stations in an environment of the wireless network of a priority user of a shared spectrum;
   using incumbent informer provider (IIP) data to generate a propagation model of spectral and temporal use of the shared spectrum by the priority user;
   identifying, within at least the wireless stations proximate the priority user, one or more groups of similarly located wireless stations;
   determining, for each group of wireless stations, a spectrum grant modification that would avoid interference with the priority user; and
   updating respective spectrum grants of each wireless station within a group of wireless stations in accordance with the spectrum grant modification determined for the group.

2. The method of claim 1, wherein the priority user of the shared spectrum comprises a RAdio Detection And Ranging (RADAR) system.

3. The method of claim 2, wherein each wireless station group comprising a plurality of wireless stations in a defined geographic area, each of the wireless stations within a wireless station group being configured for shared mode operation in substantially the same manner.

4. The method of claim 2, wherein the IIP data comprises for the RADAR system a location, operating frequency, direction of use, and timing of use.

5. The method of claim 3, wherein the shared mode operation for a wireless station comprises operating on an allowed channel during an allowed time slot.

6. The method of claim 5, wherein the allowed time slot for the wireless station is calculated using a location of the wireless station, a location of the RADAR system, and a phase of operation of the RADAR system.

7. The method of claim 3, wherein the shared mode operation for the wireless station group comprises operating on an allowed channel during an allowed time slot.

8. The method of claim 7, wherein the allowed time slot for the wireless station group is calculated using a location of the wireless station group, a location of the RADAR system, and a phase of operation of the RADAR system.

9. The method of claim 1, further comprising:
   configuring each of at least the proximate wireless stations to cease shared spectrum transmissions during at least one common time slot;
   receiving sensed energy gathered by an environmental sensing network during the at least one common time slot; and
   augmenting the IIP data with incumbent spectrum user information determined using the sensed energy.

10. The method of claim 1, wherein the IIP data is augmented with additional data calculated in response to sensed energy from an environmental sensing (ES) network.

11. The method of claim 10, wherein the sensed energy from the ES network is sensed during a quiet period during which wireless devices do not use the granted spectrum.

12. The method of claim 11, wherein the quiet period is enabled by updating spectrum grants of wireless devices to prevent spectrum usage during the quiet period.

13. Computer readable apparatus comprising a non-transitory storage medium, the non-transitory storage medium comprising at least one computer program having a plurality of instructions, the plurality of instructions configured to, when executed on a digital processing apparatus of a computerized network apparatus, cause the computerized network apparatus to:
grant one or more use rights of a shared spectrum to a plurality of wireless stations in a wireless network;
identify one or more of the plurality of wireless stations proximate to a priority user of the shared spectrum;
use incumbent informer provider (IIP) data to generate a propagation model of spectral and temporal use of the shared spectrum by the priority user;
identify, within at least the one or more of the plurality of wireless stations proximate the priority user, one or more similarly located wireless stations;
determine, for at least the one or more similarly located wireless stations, at least one spectrum grant modification that would avoid interference with the priority user; and
update at least one spectrum grant for the one or more similarly located wireless stations in accordance with the at least one spectrum grant modification.

14. The computer readable apparatus of claim 13, wherein the identification of the one or more of the plurality of wireless stations proximate to the priority user of the shared spectrum comprises identification of one or more of the plurality of wireless stations proximate to a RAdio Detection And Ranging (RADAR) system having higher priority rights than the one or more of the plurality of wireless stations.

15. The computer readable apparatus of claim 13, wherein the one or more similarly located wireless stations comprise a group of wireless stations in a defined geographic area, each of the wireless stations within the group being configured for operation in a shared mode in substantially the same manner.

16. The computer readable apparatus of claim 15, wherein the plurality of instructions configured to, when executed on the digital processing apparatus of the computerized network apparatus, cause the computerized network apparatus to:
utilize the propagation model to configure each of at least the one or more of the plurality of wireless stations to operate in the shared mode in which use of respective assigned bandwidth thereof is modified in accordance with an antenna pattern and timing of the RADAR system.

17. The computer readable apparatus of claim 15, wherein the shared mode operation for each of the wireless stations within the group comprises operation on an allowed channel during an allowed time slot.

18. The computer readable apparatus of claim 17, wherein the allowed time slot is calculated using at least one of (i) a location of the wireless station, (ii) a location of the RADAR system, and (iii) a phase of operation of the RADAR system.

19. The computer readable apparatus of claim 17, wherein the IIP data is augmented with additional data calculated in response to sensed energy from an environmental sensing (ES) network.

20. Computerized network apparatus of a content distribution network, the computerized network apparatus comprising:
processing apparatus;
network interface apparatus in data communication with the processing apparatus; and
storage apparatus in data communication with the processing apparatus and comprising a plurality of computerized instructions executable on the processing apparatus, the plurality of computerized instructions configured to, when executed by the processing apparatus, cause the computerized network apparatus to:
assign one or more spectrum grants of a shared spectrum to one or more respective wireless stations in a wireless network;
use incumbent informer provider (IIP) data to generate a propagation model of spectral and temporal use of the shared spectrum by a priority user;
determine, for at least one of the one or more wireless stations proximate the priority user of the shared spectrum, at least one respective spectrum grant modification that would avoid interference with the priority user; and
update at least one of the one or more spectrum grants associated with the at least one of the one or more wireless stations proximate the priority user, in accordance with the at least one respective spectrum grant modification.

* * * * *